F. GILLARDE.
BANANA WEIGHER AND HANGER.
APPLICATION FILED FEB. 17, 1919.

1,338,220.

Patented Apr. 27, 1920.

Witnesses
O. F. DuBois.
Charlotte A. DuBois.

Inventor.
FRANK GILLARDE.
by Atty N. DuBois.

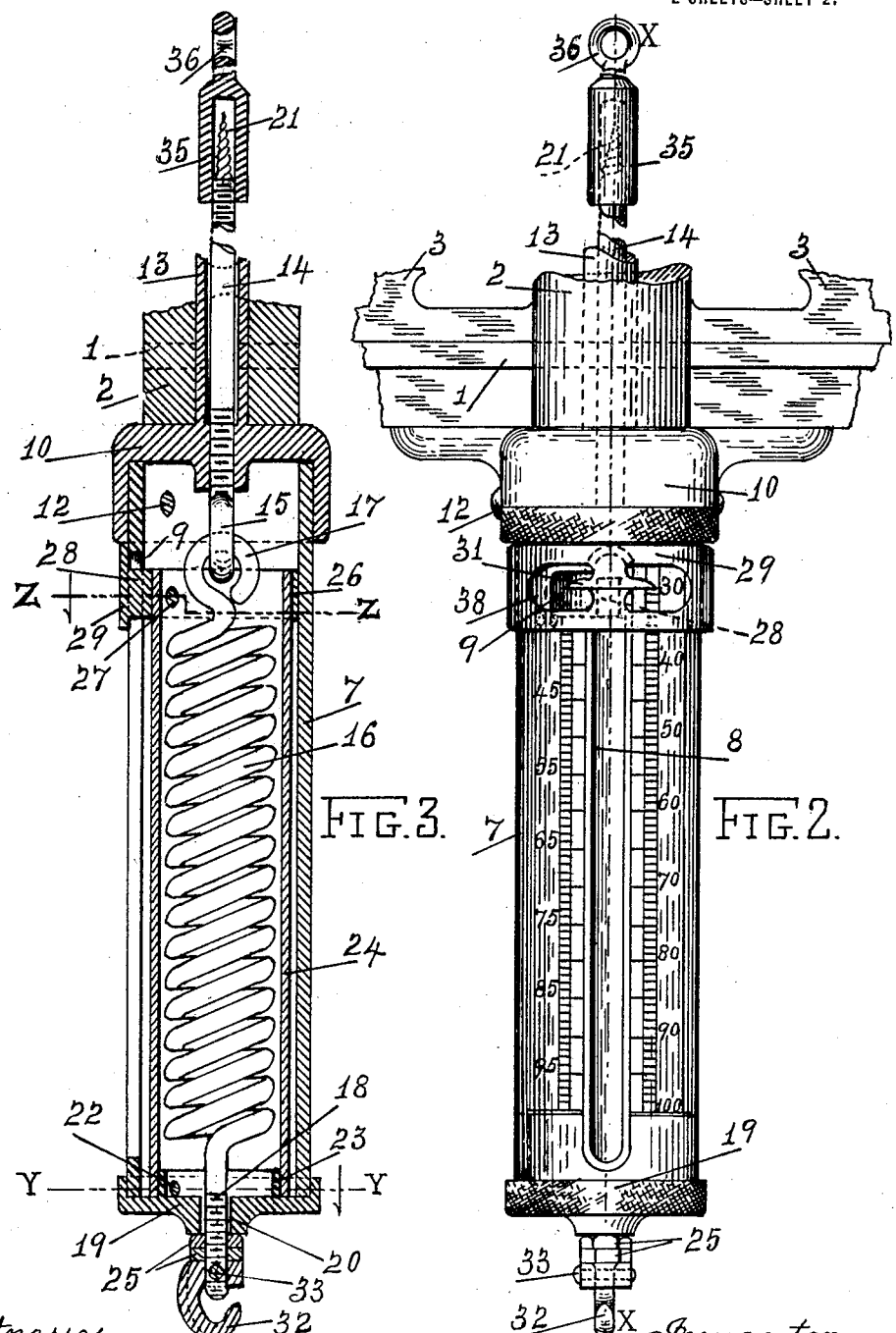

UNITED STATES PATENT OFFICE.

FRANK GILLARDE, OF SPRINGFIELD, ILLINOIS.

BANANA WEIGHER AND HANGER.

1,338,220.  Specification of Letters Patent.  Patented Apr. 27, 1920.

Application filed February 17, 1919. Serial No. 277,656.

*To all whom it may concern:*

Be it known that I, FRANK GILLARDE, a citizen of the United States, residing at Springfield, in the county of Sangamon and State of Illinois, have invented a new and useful Banana Weigher and Hanger, of which the following is a specification.

This invention relates to means for weighing and attractively displaying bunches of bananas. It is well known to the trade that bananas are of perishable nature and are very subject to injury by handling; it is therefore the common practice to ship each bunch in a separate crate, the bunch being hung in a vertical position in the crate and protected by burlap and straw. In practice it is very undesirable to lay the bunches on platform scales to weight them as that method of weighing is very likely to detach some bananas from the bunch and bruise and injure others. It is also well known that for the reason stated, a large percentage of retailers do not weight the bunches when they are delivered to them; that the shortage will frequently run from three to five pounds per bunch; and that unscrupulous jobbers sometimes take advantage of this lax practice to defraud the retailer. Prior to my invention the common practice among retailers has been to suspend by a cord or wire, connected with the store ceiling or other stationary structure, the bunch of bananas which is on sale. This mode of display is crude and often detracts from the appearance of an otherwise well kept store.

The general purpose of the present invention is to provide an equipment to weigh and display bunches of bananas, which shall obviate the objections above enumerated.

More specific purposes of the invention are; to provide a rack of neat and attractive appearance adapted to support in vertical position, a plurality of bunches of bananas, and in structural connection therewith to provide spring scales for weighing the several bunches; means for illuminating the display; means for preliminary adjustment of the spring of the scales to adapt the spring specially for weighing bunches of bananas; and to provide means for relieving the spring of the scales from the weight of the bunch of bananas which remains supported by the scales and thereby avoid relaxation of the spring.

The invention is illustrated in the annexed drawings to which reference is hereby made, and will now be described, and the novel features thereof will be recited in the claims.

Fig. 2 is an enlarged front elevation of the scale apart from the hanger;

Fig. 3 is a vertical longitudinal section on the line X. X. of Fig. 2;

Figure 1:
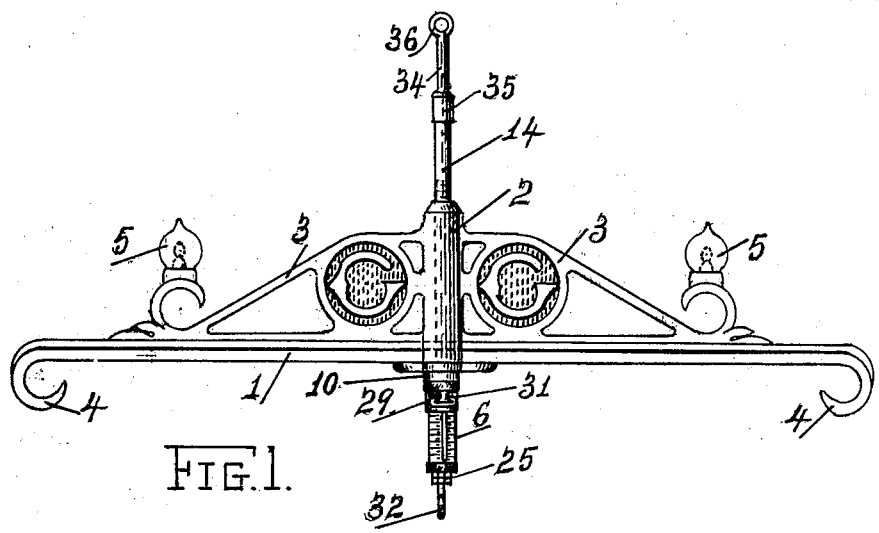
Figure 1 is a front elevation of a banana weigher and hanger, embodying my invention.
Figure 5:
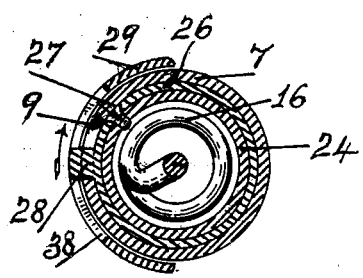
Figure 4:
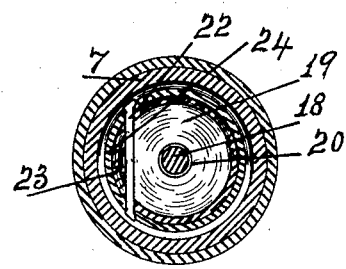

Fig. 4 is an enlarged horizontal section through the scales on the line Y. Y. of Fig. 3; and Fig. 5 is a horizontal section through the scale on the line Z. Z. of Fig. 3.

The same reference numerals designate the same parts in all the views.

The hanger is preferably of metal and comprises in a single structure, a horizontal T-bar 1; a central tubular member 2 at right angles to the bar 1; ornamental braces 3 connecting the bar 1 with the member 2; hooks 4 at the respective terminals of the bar 1 and each adapted to support a bunch of bananas; and electric lamps 5 at the outer terminals of the respective braces, receiving current from any suitable generator, not shown, adapted to illuminate the hanger.

Scales 6, of special construction, are detachably connected with the hanger by means to be hereinafter described. The scales will now be described. A tubular casing 7 has a longitudinal slot 8 and a transverse slot or way 9 opening into the slot 8. A cap 10 is secured on the upper end of the casing by a pin 12 or the like, and has an integral, central, elongated, internally, screw-threaded, hub 13. A screw rod 14 is adapted to engage the screw threads in the hub 13. The rod 14 may be of any convenient length, and the upper part of the rod is preferably in the form of a gimlet-point screw 21 adapted to enter and take hold on a ceiling or other stationary structure by which the hanger and appurtenances may be supported. It may occasionally be desired to use a suspending device of greater length than the rod 14. In that case an extension bar 34, of any suitable length, may be used. The bar 34 has at one end a sleeve 35 screwing onto the rod 14 and at the other end an eye 36 to receive a wire or similar suspending device. The rod 14 extends upward through the hub 13 and beyond the upper end of the member 2 of the hanger. The diameter of the bore of the member 2 is somewhat greater than the diameter of the hub 13 in order that the hanger may rotate freely around the hub on the upper end of the cap 10 without engaging the screw.

The hanger being supported by the suspended scales may be rotated around the hub 13 to place the hanger in the position most suitable for displaying the bunches of bananas, and the hanger may be turned by hand to bring any desired bunch in convenient position for cutting off the bananas.

A cup-shape closure 19 surrounds and closes the lower end of the casing 7 and has an integral circular ledge 23 and a central smooth hole 20. A tube 24 is adapted to slide and rotate limitably, in the casing 7. The tube surrounds the ledge 23 and is permanently connected with it by a pin 22, or the like; so that the closure will rotate with the tube. A coiled spring 16, contained in the tube 24, has at its upper end an eye 17 which in conjunction with the hook 15, flexibly connects the spring with the rod 14; and has a screw threaded terminal part 18 adapted to rotate freely in the smooth hole 20; the connections being of the nature of a swivel, permit partial rotation of the tube around the spring. Double nuts 25 engage the part 18 so that upon screwing the nuts upwardly the spring will be stretched downwardly; and reverse rotation of the nuts will permit reverse action of the spring. The purpose of this adjustment of the spring will be hereinafter explained.

The means for partially rotating the tube and for pointing to the graduations on the scale to indicate the weight of the bunch of bananas being weighed, comprises a ring 26 attached to the tube 24 by a screw 27; a radial member 28 integral with the ring and adapted to traverse the slots 8 and 9; a hand-hold 29 integral with the member 28 and usable to effect partial rotation of the tube and having openings 38 through which the graduations of the scale are visible; and pointers 31 adapted to point to the graduations on the scale.

Bunches of bananas of the size usually handled by the retail trade vary in weight from say thirty pounds to one hundred pounds per bunch. I have therefore adopted and prefer to use a scale graduated to indicate successive pounds from thirty to one hundred inclusive.

In order to admit of the use of relatively large numerals designating the graduations, I arrange the numerals in two columns, the even numbers "30", "40", "50", etc., being on one side of the slot 8, and the odd numbers "35", "45", "55", etc., being on the other side of the same slot.

During the process of manufacture the spring 16 will be made of suitable dimensions to operate within the tube 24 and will be calibrated, as nearly as may be practicable; so that when the parts are assembled and thirty pounds weight is supported on the hook 32, the spring will be relaxed, and the pointer 31 will be slightly above the graduation "30" on the scale; and if the thirty pounds weight be removed and one-hundred pounds weight be placed on the hook 32, the pointer 31 will be the same distance above the graduation "100" that it was in the first instance above the graduation "30".

In order to correct errors due to slight differences in fabricating and calibrating the springs the nuts 25 will be rotated to move upwardly on the screw member 18, to stretch the spring 16 to such extent that the pointer 31 will be exactly in line with the graduation "30" when thirty pounds is suspended on the hook 32, and will be exactly in line with the graduation "100" when one-hundred pounds is suspended on the same hook. When the adjustment as described is completed the lower nut 25 will be jammed against the upper nut to prevent loosening of the nuts and displacement of the parts.

The apparatus shown and described is adapted to display three bunches of bananas, one bunch being suspended on the scales-hook 32 and two bunches being suspended on the hanger-hooks 4.

The weight of the bunch on the hook 32, if constantly supported by the spring 16 alone, would obviously tend to weaken the spring; I have therefore provided means already described, for taking the weight off the spring.

To set the mechanism to take the weight off the spring, the procedure will be as follows: After weighing the bunch, which is to remain on the hook 32, the bunch will be lifted by hand to permit the spring 16 to act to slide the tube 24 upwardly in the casing 7 to bring the member 28 in line with slot 9, and the hand-hold 29 will be grasped in the hand and used to partially rotate the tube 24 to cause the member 28 to enter the slot 9 and support the tube in its raised position, and while the tube is in that position the spring will be relaxed and relieved from the weight of the suspended bunch of bananas.

To withdraw the member 28 from the slot 9 the hand-hold will be rotated in the opposite direction and thereupon the scales will be in condition for the next weighing.

I do not restrict the claims to the precise construction shown and described, since it is obvious that minor details of construction may be varied without departure from my invention.

Having fully described my invention, what I claim as new and desire to secure by Letters Patent is:

1. In a banana weigher and hanger, the combination of a casing, a cap on the casing and having an elongated internally screw-threaded hub; a weighing spring within the casing; a screw rod engaging in the screw-threaded hub of the cap and connected with and sustaining the weighing spring, and adapted to take hold on a permanent structure to support the casing and connected parts thereon, and a hanger supported on said cap and rotative around the hub thereof.

2. In a banana weigher and hanger, the combination of a casing having a scale with graduations "30" to "100" inclusive; a cap attached to the casing and having a central hub with internal screw-threads; a hanger supported on said cap and rotative around the hub thereof; a weighing spring within the casing; a rod connected with the weighing spring and screwing into the hub of the cap and adapted to take hold on a stationary structure to support the weigher and hanger; a pointer slidable on the casing; and means for adjusting the weighing spring to cause accurate alinement of the pointer with the graduations of the scale.

3. In a banana weigher and hanger, the combination of a casing; a weighing spring inside the casing; a cap connected with the casing and having an internally screw-threaded hub; a hanger supported on the cap and rotative around the hub thereof; a screw rod engaging in said hub and supporting the weighing-spring; and an extension bar adapted to screw onto said screw rod.

4. In a banana weigher and hanger, the combination of a suspended weighing device having a spring, a longitudinal slot, a transverse slot, and graduations; a hanger rotative on the weighing device; and a hand-hold rotative on the weighing device and having a member adapted to traverse the longitudinal slot and enter the transverse slot of the weighing device, to sustain the spring to keep the weighing device in relaxed condition.

5. In a suspended banana weigher and hanger, the combination of a casing having a longitudinal slot, a transverse slot, and graduations; a spring inside the weighing device; a tube slidable and rotative in the weighing device and connected with the spring; means for adjusting the spring; and a rotative hand-hold connected with the tube and having a member adapted to traverse the longitudinal slot and enter the transverse slot of the weighing device and having a pointer adapted to point to the graduations of the weighing device.

6. In a banana weigher and hanger, the combination of a tubular casing; a cap connected with the casing and having an elongated hub; a rod extending through the hub of the cap and supporting the casing; a hanger rotative around the hub of the cap; a tube rotative and slidable in the casing; a closure attached to the tube and having a central opening; a spring supported by said rod and having a terminal screw; a hand-hold adapted to rotate the sleeve; and nuts rotative on the screw of the spring and acting on the closure to stretch the spring.

In witness whereof I have hereunto signed my name at Springfield, Illinois, this 13th day of November, 1918.

FRANK GILLARDE.

Witnesses:
W. S. TROXELL,
G. D. TROXELL.